United States Patent [19]

Ferrante et al.

[11] Patent Number: 5,194,989
[45] Date of Patent: Mar. 16, 1993

[54] DIELECTRIC COMBINER INCLUDING FIRST AND SECOND DIELECTRIC MATERIALS HAVING INDICES OF REFRACTION GREATER THAN 2.0

[75] Inventors: Ronald A. Ferrante, St. Charles; Rex G. Carnes, Hazelwood, both of Mo.

[73] Assignee: McDonnell Douglas Corporation, St. Louis, Mo.

[21] Appl. No.: 793,529

[22] Filed: Nov. 18, 1991

Related U.S. Application Data

[63] Continuation-in-part of Ser. No. 519,896, May 7, 1990, abandoned.

[51] Int. Cl.⁵ .......................... G02B 1/00; G02B 5/28; G02B 27/14
[52] U.S. Cl. .................................... 359/583; 359/586; 359/589; 359/634
[58] Field of Search ............... 359/634, 630, 629, 583, 359/586, 589

[56] References Cited

U.S. PATENT DOCUMENTS

| | | | |
|---|---|---|---|
| 2,742,819 | 4/1956 | Koch et al. | 359/588 |
| 2,852,974 | 9/1958 | Nobles | 359/630 |
| 3,230,819 | 1/1966 | Noxon | 359/629 |
| 3,614,314 | 10/1971 | Rossire | 359/629 |
| 3,895,155 | 7/1975 | Shukuri et al. | 359/507 |
| 3,914,023 | 10/1975 | Thelen | 359/588 |
| 4,615,034 | 9/1986 | von Gunten et al. | 359/588 |
| 4,701,663 | 10/1987 | Kawakatsu et al. | 359/586 |
| 4,805,989 | 2/1989 | Nakajima | 359/603 |
| 4,940,636 | 7/1990 | Brock et al. | 359/586 |
| 4,955,705 | 9/1990 | Nakajima et al. | 359/603 |
| 4,968,117 | 11/1990 | Chern et al. | 359/589 |
| 4,983,001 | 1/1991 | Hagiuda et al. | 359/584 |
| 5,007,710 | 4/1991 | Nakajima et al. | 359/603 |

OTHER PUBLICATIONS

Ron Lovell, "New Displays for Space Flight", *Electronics*, Feb. 1964, pp. 42-43.

*Primary Examiner*—Jon W. Henry
*Attorney, Agent, or Firm*—Guy R. Gosnell; Benjamin Hudson, Jr.; Timothy H. Courson

[57] ABSTRACT

There is provided by this invention an apparatus for combining a reflected image in a heads-up-display system with an unobstructed view of the outside world and a system for providing a heads-up-display. The heads-up-display system utilizes a dielectric combiner in order to eliminate flare and increase the system's mechanical stability. The combiner apparatus is comprised of a transmissive substrate and a plurality of dielectric layers which selectively reflects light within a narrow range of wavelengths. The use of dielectric thin films provides a mechanically stable and durable combiner element for a heads-up-display system while eliminating the deleterious effects of flare present in combiner elements utilizing a holographic optical element.

8 Claims, 1 Drawing Sheet

DIELECTRIC COMBINER INCLUDING FIRST AND SECOND DIELECTRIC MATERIALS HAVING INDICES OF REFRACTION GREATER THAN 2.0

This is a continuation-in-part of copending application Ser. No. 07/519,896 filed on May 7, 1990 now abandoned.

BACKGROUND OF THE INVENTION

1. Field of the Invention

The present invention relates generally to heads-up displays and more particularly to heads-up displays employing a combiner with a thin dielectric film for providing high reflectance and high photopic transmittance.

2. Description of the Prior Art

In modern aircraft, both military and commercial, it is important that certain information be clearly and unobtrusively presented to the pilot while he is viewing the outside world. The heads-up display (HUD) has been developed for this purpose and provides relevant scale, alphanumerics, symbology, and other information displays superimposed on the pilot's forward field of view. With conventional HUD designs, as illustrated in an article by Leonard Ravich in the April 1986 issue of Laser Focus/Electro-Optics, the information display is generated on a high-brightness cathode ray tube. The information display is projected through a relay lens system to a mirror which reflects the display through a collimating lens onto a transparent combiner element which is located between the pilot and the aircraft windscreen. The combiner reflects the projected images to the pilot's eyes while affording him an unobstructed view of the outside world through the combiner and windscreen.

A typical HUD combiner is composed of a glass substrate upon which a holographic film is deposited for reflection of the projected image. This film comprises one or more layers of photoreactive gelatin which have been exposed by a holographic process in order to record a holographic fringe pattern and which have been subsequently developed by wet chemical processing as disclosed in Holographic HUDS De-mystified by J. H. Gard in the 1982 issue of IEEE National Aerospace and Electronics Conference Proceedings held in May 1982. The glass substrate and holographic film are then encased by a glass cover plate for environmental protection.

It is usually desirable to construct a hologram with fringes that are parallel to the surface of the gelatin. However, design constraints, such as optically recorded noise patterns, may prevent this construction. In these cases, the fringes intersect the surface and form a slant fringe pattern which produces extraneous diffraction images. The extraneous diffraction is termed "flare".

A common problem of holographic combiners as a result of flare is the diffraction of points of light, such as the beams from airport runway lights, when viewed through a holographic combiner. Diffraction produces multiple images of the light sources. Under certain conditions, particularly in night landings substantial portions of the pilot's field of view may be obscured by the flare from runway lights.

Another limitation with holographic combiners is the environmental instability of the gelatin layer. The holographic combiner must be covered by glass plates in an attempt to protect the gelatin film from high humidity conditions which would destroy it. The glass cover plates also serve to protect the gelatin from mechanical abrasive damage of which the gelatin film is extremely susceptible. Since the gelatin film is an organic, high temperature can chemically destroy it, so the film must be protected from high temperature exposure also. An additional problem encountered with holographic combiners is the complex wet chemical development which is required to fabricate the gelatin.

A further problem with such HUD combiner is the tendency of the layers of the film to delaminate both from the substrate and from other, adjacent layers therein. Such delamination is due to the differing coefficients of expansion between the various layers of the film such that as the combiner is subjected to varying thermal conditions, the layers expand or shrink at varying amounts resulting in delaminations between the layers. It would be desirable to develop a HUD combiner which did not exhibit flare or require special environmental protection from high humidity or high temperature conditions. Furthermore, it would be desirable for a HUD combiner not to require a gelatin film which necessitates complex wet chemical development processing and which is extremely sensitive to mechanical abrasion damage. Additionally, it would be desirable for a HUD combiner to not delaminate between the layers comprising the film.

SUMMARY OF THE INVENTION

There is provided by this invention a device for use as a combiner in a heads-up display (HUD) system which utilizes a thin dielectric film placed on a substrate to achieve high reflectance and high photopic transmittance. The substrate is transmissive for all wavelengths of light, while the dielectric layer is highly reflective for wavelengths of light within a predetermined spectrum and is otherwise highly transmissive. The dielectric combiner herein disclosed comprises a glass substrate upon which a number of alternating layers of thin dielectric films are deposited. The dielectric combiner eliminates the occurrence of flare inherent in prior art systems. Additionally, the dielectric combiner does not require environmental protection, such as glass cover plates, to protect it from high humidity or high temperature conditions. The dielectric combiner is less susceptible to mechanical abrasion damage and does not require complex wet chemical development as does the gelatin layer of a holographic combiner.

An alternative embodiment is provided whereby the plurality of layers are comprised of the same material having the same coefficient of thermal expansion to prevent delaminations between the layers. The layers are deposited in an alternating fashion by reactive ion plating forming a more dense structure having a corresponding higher index of refraction and evaporate coating forming a less dense structure having a corresponding lower index of refraction.

BRIEF DESCRIPTION OF THE PREFERRED EMBODIMENT

Figure 1:
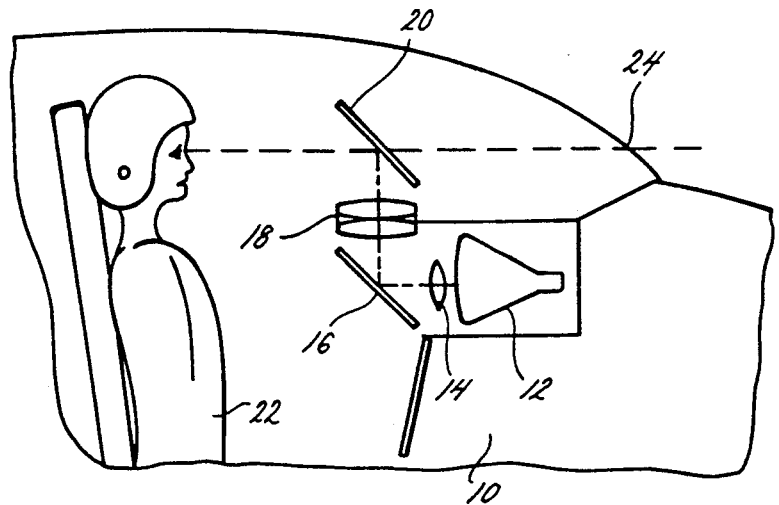
FIG. 1 is a side view of a conventional HUD system.

Referring to FIG. 1, there is shown a side view of a typical HUD system 10 contained in an aircraft. The HUD system 10 is generally comprised of a cathode ray tube (CRT) 12, a set of relay lenses 14, a mirror 16, a collimating lens 18, and a combiner 20. The design and fabrication of a set of relay lenses 14 to properly image the CRT 12 output is well known to those skilled in the art as is illustrated by the description in U.S. Pat. No. 4,763,990, herein incorporated by reference, which describes in substantial detail the embodiment of a conventional set of relay lenses.

The combiner 20 presents an image of the display information from the CRT 12 to the pilot 22. The image reflected by the combiner 20, containing the symbols and alphanumerics displayed by the CRT 12, is then superimposed upon the view of the pilot 22 through the windshield 24. The image reflected by the combiner 20 appears to the pilot 22 to be focused at infinity so that the pilot 22 need not refocus his eyes to see the view of the outside or the superimposed image.

Figure 2:
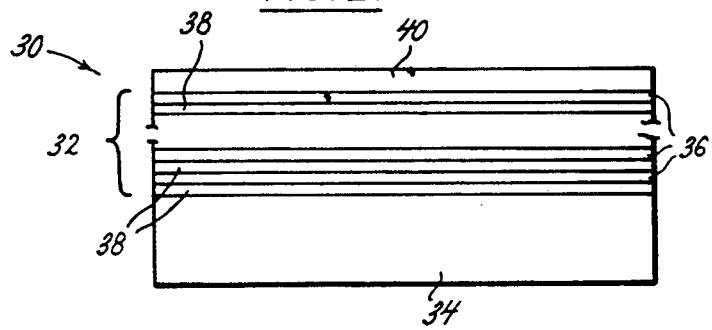
FIG. 2 is a sectional view of the dielectric combiner incorporating the principles of this invention with the specific layers of the thin dielectric film identified.

A sectional view of a dielectric combiner 30 incorporating the principles of this invention is shown in FIG. 2. A thin dielectric film 32 is deposited upon a substrate 34 which may be composed of BK-7 glass. The thin dielectric film 32 is comprised of a plurality of alternating layers wherein each of the alternating layers has a high index of refraction so as to maximize the angular bandwidth reflected. Preferably the material forming each of the two alternating layers has an index of refraction greater than 2.0. Additionally, the difference in the refractive index of the materials forming each of the two, alternating layers is as small as possible to also increase the reflected angular bandwidth.

Preferably, the thin dielectric film 32 is formed of a plurality of alternating layers of titanium oxide ($TiO_2$) 36 having an index of refraction of 2.49, and either tantalum oxide ($Ta_2O_5$) or zirconium oxide ($ZrO_2$) 38, each of which having an index of refraction of 2.25. Alternatively, the thin dielectric film 32 may be comprised of a plurality of layers of aluminum oxide ($Al_2O_3$) and silicon dioxide ($SiO_2$) which are alternately deposited upon the substrate 34, however, other compounds could be utilized if they are durable and have appropriate indices of refraction for the wavelength of light which is desired to be reflected. The plurality of layers is covered by a protective layer 40 which may be composed of silicon dioxide ($SiO_2$) to protect the thin dielectric film 32 from mechanical abrasion damage and to control the out of band ripple in the transmittance characteristics.

The substrate 34 is chosen so as to be transmissive for light of all wavelengths, while the dielectric film 32 is designed to reflect light waves with a wavelength within a predetermined spectrum, as hereinafter described, while remaining highly transmissive for light waves of all other wavelengths.

While the layers may be of any desired thickness, the layers are preferably of the third order such that the mechanical thickness of each of the individual layers is determined by the formula:

$$\text{mechanical thickness} = (3 \times \lambda)/(4 \times n)$$

where $\lambda$ is the wavelength of light to be reflected by the dielectric combiner 30 and "n" is the index of refraction of the material forming the particular layer. By utilizing third order layer the number of necessary layers is decreased to simplify the design and fabrication of the combiner 20. The formula assumes a 0° angle of incidence between the incident light wave and a line perpendicular to the surface of the combiner. For example, the wavelength of light to be reflected may be 543 nanometers, corresponding to green light, and the index of refraction for the thin film layer may be 2.49, corresponding to the index of refraction for a thin film of titanium oxide ($TiO_2$), so that the depth of each of the individual layers of titanium oxide ($TiO_2$) would be 163.6 nanometers. An identical procedure is also utilized to determine the thickness of the other layer The wavelength of light to be reflected may thus be precisely controlled by the choice of an appropriate thickness for the individual dielectric layers.

As with conventional holographic combiners, the wavelength of light which is most effectively reflected is varied slightly as the angle with which the light waves reach the combiner is altered. For a dielectric combiner as herein disclosed with dielectric layers of a constant thickness, as the incidence angle between the incoming light waves and a line perpendicular to the surface of the combiner is increased from 0°, the wavelength of light most efficiently reflected gradually decreases. For example, for a dielectric combiner with layers of a constant thickness, the wavelength most efficiently reflected at a 0° incidence angle is 572.3 nanometers while at a 28° incidence angle it is 543 nanometers. The comparison of reflection efficiencies shown in FIG. 3 and hereinafter explained is illustrative of combiners which have been designed so that the wavelength of light which is desired to be reflected attains a maximum reflection efficiency at approximately 28°.

The thin dielectric film 34 and the protective layer 40 may be deposited upon the substrate 34 by any of the traditional methods utilized for dielectric deposition, such as electron beam physical vapor deposition. Therefore, the dielectric combiner 30 does not necessitate the complex wet chemical development processing required by combiners utilizing holographic gelatin films. Additionally, the dielectric combiner 30 does not require optical fabrication, as does a holographic combiner, so flare is eliminated.

An alternative embodiment is provided whereby the plurality of alternating layers comprising the thin dielectric film 34 are comprised of the same material. In this alternative embodiment the layers while being comprised of same material are deposited in an alternating fashion by either reactive ion plating or evaporative coating. Reaction ion plating provides a layer of the material which is more dense than that provided by a evaporative coating due to air gaps in the material introduced by the evaporative coating. Thus the index of refraction of the material deposited by reactive ion plating is greater than that of the same material deposited by evaporative coating. The difference in the index of refraction of 0.2–0.3 is generally observed for materials such as titanium oxide ($TiO_2$). Since the same material is being deposited by both the reactive ion plating and the evaporative coating methods, the coefficient of thermal expansion of the layers is identical although the index of refraction of the layers vary. Since the coefficient of thermal expansion is identical between the plurality of layers, each layer will expand or contract at an equivalent rate such that delaminations do not occur as in the prior art in conditions of thermal stress. However, the plurality of layers forming the thin dielectric film 34 will provided alternating layers of differing index of refraction so as to provide the necessary reflection within the desired wavelength band to enable the combiner 30 to properly function.

A dielectric combiner 30 of either embodiment is environmentally stable due to the materials and processing steps utilized in its fabrication. Thus, the dielectric combiner 30 does not require cover plates to protect it from high humidity conditions as does a holographic combiner. Likewise, the dielectric combiner 30 can withstand high temperature conditions which a holographic combiner could not tolerate.

Figure 3:
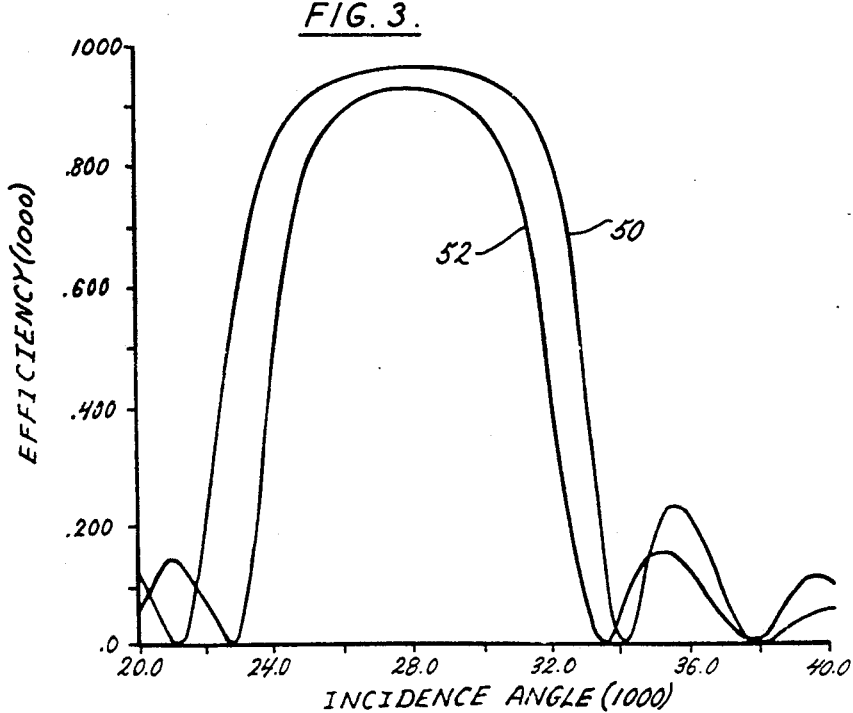
FIG. 3 is a diagram of the angular response of both a dielectric combiner as herein disclosed and a holographic combiner.

An additional advantage of either embodiment of the dielectric combiner 30 is illustrated in FIG. 3 wherein the efficiency of reflection from a combiner is plotted versus the incidence angle, measured from a line perpendicular to the surface of the combiner, of the light to be reflected. As shown in FIG. 3, a broader range of incidence angles reflect with high reflection efficiency, i.e. greater than 0.90, with a dielectic combiner, represented by graph 50, than with a holographic combiner, represented by graph 52. The broader angular response provides for greater display brightness uniformity.

In addition to the context of an aircraft HUD in which the dielectric combiner has been discussed, it is obvious that the dielectric combiner could be utilized in many other applications, such as automotive displays, helmet mounted displays, or laser rejection filter goggles.

Although there has been illustrated and described specific detail and structure of operations, it is clearly understood that changes and modifications may be readily made therein by those skilled in the art without departing from the spirit and the scope of this invention.

We claim:

1. A dielectric combiner, comprising:
   a) a substrate for transmitting light therethrough; and
   b) a plurality of dielectric layers comprised of alternating layers of a first dielectric material and a second dielectric material, each layer having a high index of refraction, deposited upon the substrate for reflecting a predetermined spectrum of light and otherwise transmitting light therethrough wherein the index of refraction of both the first dielectric material and the second dielectric material is greater than 2.0.

2. The dielectric combiner as recited in claim 1, wherein the first dielectric material is titanium oxide ($TiO_2$) and the second dielectric material is selected from the group consisting of tantalum oxide ($Ta_2O_5$) and zirconium oxide ($ZrO_2$).

3. The dielectric combiner as recited in claim 1, wherein both the first dielectric material and the second dielectric material are comprised of the same material, the first dielectric material being deposited by means of reactive ion plating, the second dielectric material being deposited by means of evaporative coating.

4. The dielectric combiner as recited in claim 3, wherein both the first and second dielectric material is titanium oxide ($TiO_2$).

5. A heads-up display system, comprising:
   a) a means for displaying an image;
   b) a plurality of relay lenses for focusing the image displayed by the cathode ray tube;
   c) a mirror for reflecting the image received from the plurality of relay lens;
   d) a collimating lens for aligning the reflected image; and
   e) a dielectric combiner having a substrate for transmitting light therethrough and a plurality of dielectric layers comprised of alternating layers of a first dielectric material and a second dielectric material, each layer having a high index of refraction, deposited upon the substrate for reflecting a predetermined spectrum of light and otherwise transmitting light therethrough wherein the index of refraction of both the first dielectric material and the second dielectric material is greater than 2.0.

6. The dielectric combiner as recited in claim 5, wherein the first dielectric material is titanium oxide ($TiO_2$) and the second dielectric material is selected from the group consisting of tantalum oxide ($Ta_2O_5$) and zirconium oxide ($ZrO_2$).

7. The dielectric combiner as recited in claim 5, wherein both the first dielectric material and the second dielectric material are comprised of the same material, the first dielectric material being deposited by means of reactive ion plating, the second dielectric material being deposited by means of evaporative coating.

8. The dielectric combiner as recited in claim 7, wherein both the first and second dielectric material is titanium oxide ($TiO_2$).

* * * * *